Figure 5:
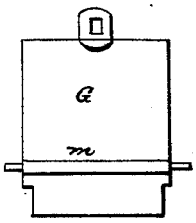
Figure 4:
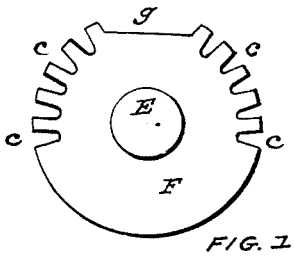
Figure 2:
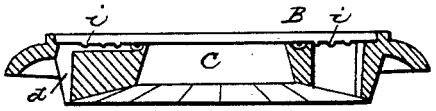
Figure 1:
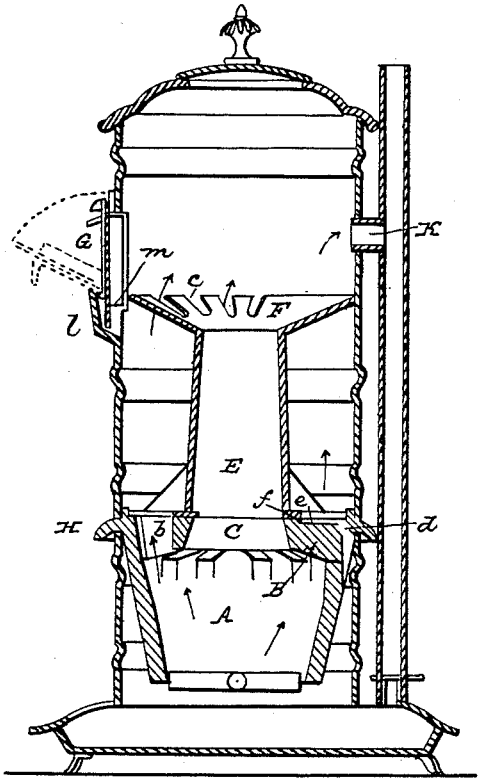
Figure 3:
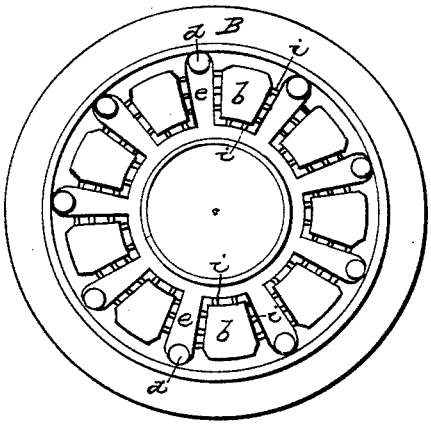

126. STOVES & FURNACES,
Stoves, Heating, Magazine,
Revertible draft, base heating.
74

G. J. KINGSBURY.

Magazine Stove.

No. 297. A. I. Patented Sept. 18, 1860.

WITNESSES:
J. Fraser
S. J. Allis

INVENTOR.
G. J. Kingsbury

N. PETERS, Photo-Lithographer, Washington, D. C.